United States Patent
Erdmann et al.

(10) Patent No.: US 7,873,456 B2
(45) Date of Patent: Jan. 18, 2011

(54) AGRICULTURAL HARVESTING MACHINE WITH TRANSFER DEVICE

(75) Inventors: Hubert Erdmann, Bielefeld (DE); Thomas Tilly, Warendorf (DE); Markus Hohlfeld, Rheine (DE); Reinhard Laing, Harsewinkel (DE); Heinrich Isfort, Duelmen (DE); Eckehard Jeppe, Zierenberg (DE); Heinrich Schneider, Harsewinkel (DE); Norbert Strieker, Verl (DE); Manfred Pollklas, Rheda-Wiedenbrueck (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 666 days.

(21) Appl. No.: 11/944,736

(22) Filed: Nov. 26, 2007

(65) Prior Publication Data

US 2008/0133095 A1    Jun. 5, 2008

(30) Foreign Application Priority Data

Nov. 30, 2006  (DE) ................. 10 2006 056 933

(51) Int. Cl.
*A01D 41/02* (2006.01)
*A01D 57/20* (2006.01)
(52) U.S. Cl. ...................... 701/50; 56/10.2 R
(58) Field of Classification Search ............ 701/50
See application file for complete search history.

(56) References Cited

U.S. PATENT DOCUMENTS

| | | | | | |
|---|---|---|---|---|---|
| 3,898,940 | A | * | 8/1975 | Ede | 111/200 |
| 4,027,606 | A | * | 6/1977 | Knapp | 111/178 |
| 4,121,778 | A | * | 10/1978 | Quick | 241/79 |
| 4,783,952 | A | * | 11/1988 | Morellini | 56/13.9 |
| 4,924,943 | A | * | 5/1990 | Maichle | 172/1 |
| 5,129,438 | A | * | 7/1992 | Hamilton | 144/343 |
| 5,339,611 | A | * | 8/1994 | Roderfeld et al. | 56/10.2 R |
| 5,404,958 | A | * | 4/1995 | Weiss | 172/439 |
| 5,799,474 | A | * | 9/1998 | Ingram | 56/14.5 |
| 5,960,614 | A | * | 10/1999 | Jones | 56/15.2 |
| 5,964,081 | A | * | 10/1999 | Ingram | 56/14.5 |
| 6,192,664 | B1 | * | 2/2001 | Missotten et al. | 56/10.2 R |
| 6,559,655 | B1 | * | 5/2003 | Rosenthal et al. | 324/634 |
| 6,612,375 | B2 | * | 9/2003 | Rogala | 172/8 |
| 6,834,736 | B2 | * | 12/2004 | Kramer et al. | 180/89.12 |
| 6,935,693 | B2 | * | 8/2005 | Janscha et al. | 297/344.15 |
| 6,966,502 | B2 | * | 11/2005 | Wilt | 239/172 |
| 7,380,392 | B2 | * | 6/2008 | Willem et al. | 56/314 |
| 7,584,685 | B2 | * | 9/2009 | Crist | 74/574.1 |
| 2003/0085042 | A1 | * | 5/2003 | Rogala | 172/2 |
| 2003/0201660 | A1 | * | 10/2003 | Janscha et al. | 297/216.17 |
| 2004/0112659 | A1 | * | 6/2004 | Kramer et al. | 180/89.12 |
| 2006/0081086 | A1 | * | 4/2006 | Crist | 74/574.1 |
| 2006/0213407 | A1 | * | 9/2006 | Sauder et al. | 111/200 |

FOREIGN PATENT DOCUMENTS

EP                433669 A1 *  6/1991

* cited by examiner

*Primary Examiner*—Thomas G Black
*Assistant Examiner*—Shelley Chen
(74) *Attorney, Agent, or Firm*—Michael J. Striker

(57) ABSTRACT

An agricultural harvesting machine, in particular a self-propelled forage harvester for picking up and processing crop material has a transfer device—which is located downstream from feeder and chopping devices and is swivelable around a horizontal and vertical axis—for transferring the crop material, and at least one dampening device—which is located between the vehicle body and the transfer device—for dampening the vibrations of the transfer device. The dampening device may be adjusted as a function of specified operating criteria in order to dampen the vibrations of the transfer device.

13 Claims, 1 Drawing Sheet

AGRICULTURAL HARVESTING MACHINE WITH TRANSFER DEVICE

CROSS-REFERENCE TO A RELATED APPLICATION

The invention described and claimed hereinbelow is also described in German Patent Application DE 10 2006 056 933.4 filed on Nov. 30, 2006. This German Patent Application, whose subject matter is incorporated here by reference, provides the basis for a claim of priority of invention under 35 U.S.C. 119(a)-(d).

BACKGROUND OF THE INVENTION

The present invention relates to an agricultural harvesting machine with a transfer device that includes a dampening device.

Agricultural harvesting machines, and forage harvesters in particular, include transfer devices—which are usually height-adjustable using hydraulics or electric motors, and which are referred to, e.g., as upper discharge chutes—for transferring the crop material to a loading chamber of an accompanying vehicle. Given the trend toward larger harvesting machines with larger front harvesting attachments, there is an urgent need to extend the length of the transfer devices accordingly.

The position of the transfer device on the forage harvester is adjustable, in order to hit the loading chamber of the accompanying vehicle as directly as possible and to load the material as evenly as possible. The transfer device is typically rotatable around the vertical axis and is swivelable around a horizontal axis, in order to control the height of the discharge end. A swivelable discharge flap is typically mounted on the end of the transfer device, which serves to vary the direction of the crop material stream that is ejected. The position changes are implemented using actuators that are actuated without the use of muscular energy, and that are typically designed as hydraulic cylinders.

Transfer devices of this type are typically supported in a relatively rigid manner, to prevent strong horizontal motions when driving over uneven terrain. Given the trend toward longer transfer devices in particular, it is disadvantageous for strong forces to act on the fastening elements of the transfer device and on the transfer device itself. The use of more highly-stressable materials is not desirable, as this would increase manufacturing costs.

As an alternative, it is known from the related art to operate transfer devices of this type—which are designed as upper discharge chutes—with hydro-pneumatic spring action. To cushion and/or dampen the transfer device of a self-propelled forage harvester, a permanent hydro-pneumatic dampening device with a "nitrogen bladder reservoir" is provided, which dampens forces that act on the transfer device. A disadvantage of this design is that permanent dampening of the transfer device—with its increasing length—greatly impairs the control of the process of transferring the crop material to the hauling vehicle during the harvesting operation, in particular when driving over uneven terrain. It is highly desirable to load the loading chamber of the accompanying vehicle that is driving alongside with great precision, to prevent a considerable loss of crop material.

SUMMARY OF THE INVENTION

The object of the present invention, therefore, is to avoid the disadvantages of the related art described above and, in particular, to provide an adjustable and controllable dampening device for a transfer device, which is adjustable as a function of operating criteria that may be determined.

In keeping with these objects and with others which will become apparent hereinafter, one feature of the present invention resides, briefly stated, in an agricultural harvesting machine, comprising a vehicle body; feeder and chopping devices; a transfer device located downstream from said feeder and chopping devices and swivelable around a horizontal and vertical axis, for transferring a crop material; at least one dampening device located between said vehicle body and said transfer device for dampening vibrations of said transfer device, said dampening device being adjustable as a function of specified operating criteria of the agricultural harvesting machine in order to dampen the vibrations of said transfer device.

Given that the dampening device for dampening vibrations of the transfer device of an agricultural harvesting machine is adjustable as a function of specified operating criteria, the dampening of the transfer device is advantageously adjusted to highly diverse application conditions, so that, if high loads are placed on the transfer device itself or its fastening elements, dampening can take place—and, therefore, damage to material can be prevented—and, when crop material is transferred to a hauling vehicle, the dampening device may be blocked to attain a high level of controllability of the crop material stream.

With the proposed embodiment of the components, only a small amount of manufacturing outlay is advantageously required to connect the hydro-pneumatic dampening to the hydraulic system of the agricultural harvesting machine. The mechanical and hydro-pneumatic components of the dampening device, in particular of the at least one hydraulic cylinder, the pressure reservoir, and the valve device, are designed to provide dampening under a maximum load of the transfer device.

In an advantageous refinement of the present invention, the valve device located between the pressure chamber of the at least one hydraulic cylinder and the associated pressure chamber is designed as a proportional valve, thereby enabling the dampening rate of the dampening device to be adapted, adjusted and/or regulated to the different operating criteria, and thereby enabling the pressure line to be blocked.

The optimal adjustment and/or blockage of the dampening device for maintaining a controllable crop material stream when transferring the crop material to a hauling vehicle, and for protecting the material of the transfer device is attainable when the operating criteria—as a function of which the dampening rate and/or blockage of the dampening device are/is carried out—are the ground speed, the crop material throughput quantity, the height of the associated front attachment, the position of the transfer device, and the operating state of the chopper drum, because information about the load on the transfer device may be deduced from these operating criteria in particular.

In the simplest case, the dampening device remains shut off when the transfer device conveys crop material, and it is switched on and dampens vibrations of the transfer device when the transfer device does not convey crop material, therefore ensuring that dampening does not take place during the harvesting procedure, to ensure controlled loading to the hauling vehicle, and ensuring—e.g., when turning the agricultural harvesting machine or when switching from one field of crops to another—that the vibrations acting on the transfer device are dampened, in order to protect the material.

In an advantageous refinement of the present invention, an evaluation and control device is provided to control the dampening device, via which the dampening rate of the dampening device may be switched on and off or adjusted as a function of the operating criteria. In the simplest case, the dampening device is switched on and off, and the dampening rate of the dampening device is adjusted manually by the operator of the agricultural harvesting machine, or automatically using an electronic control.

Given that the agricultural harvesting machine includes suitable means for ascertaining the operating criteria—the means being designed as sensors that provide signals—the dampening device may be adjusted as a function of the signals.

It is particularly practical to integrate this process for activating the dampening device in an existing electronic headland management system. The headland management system automatically activates the dampening device while the harvesting machine travels across the headland and/or the end of the field, and it automatically adjusts the dampening rate, thereby dampening the loads—which occur in these areas in particular—on the transfer device caused by traveling across uneven terrain.

In a simple embodiment of the present invention, the transfer device includes a load sensor for sensing the load. The load sensor is preferably designed as a force-measuring bolt, so that the actual load on the transfer device or on the fastening elements of the transfer device may be continually ascertained.

Given that the agricultural harvesting machine includes a driver's cab with a display unit—it being possible to visualize the particular status of the dampening device, i.e., active or inactive, and the particular dampening rate on the display unit—the driver is continually informed about the switchover from the transfer device being dampened or undampened. The operator is often unaware of switchovers of this type, which take place during the harvesting operation.

Instead of an adjustable dampening device for the transfer device of a forage harvester, other harvesting machines such as combine harvesters, potato harvesters, or sugar-beet lifters and their transfer devices—and the unloading auger or the delivery belt of the potato lifter or the sugar-beet lifter—may be equipped with a dampening device that is adjustable based on specified operating criteria.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
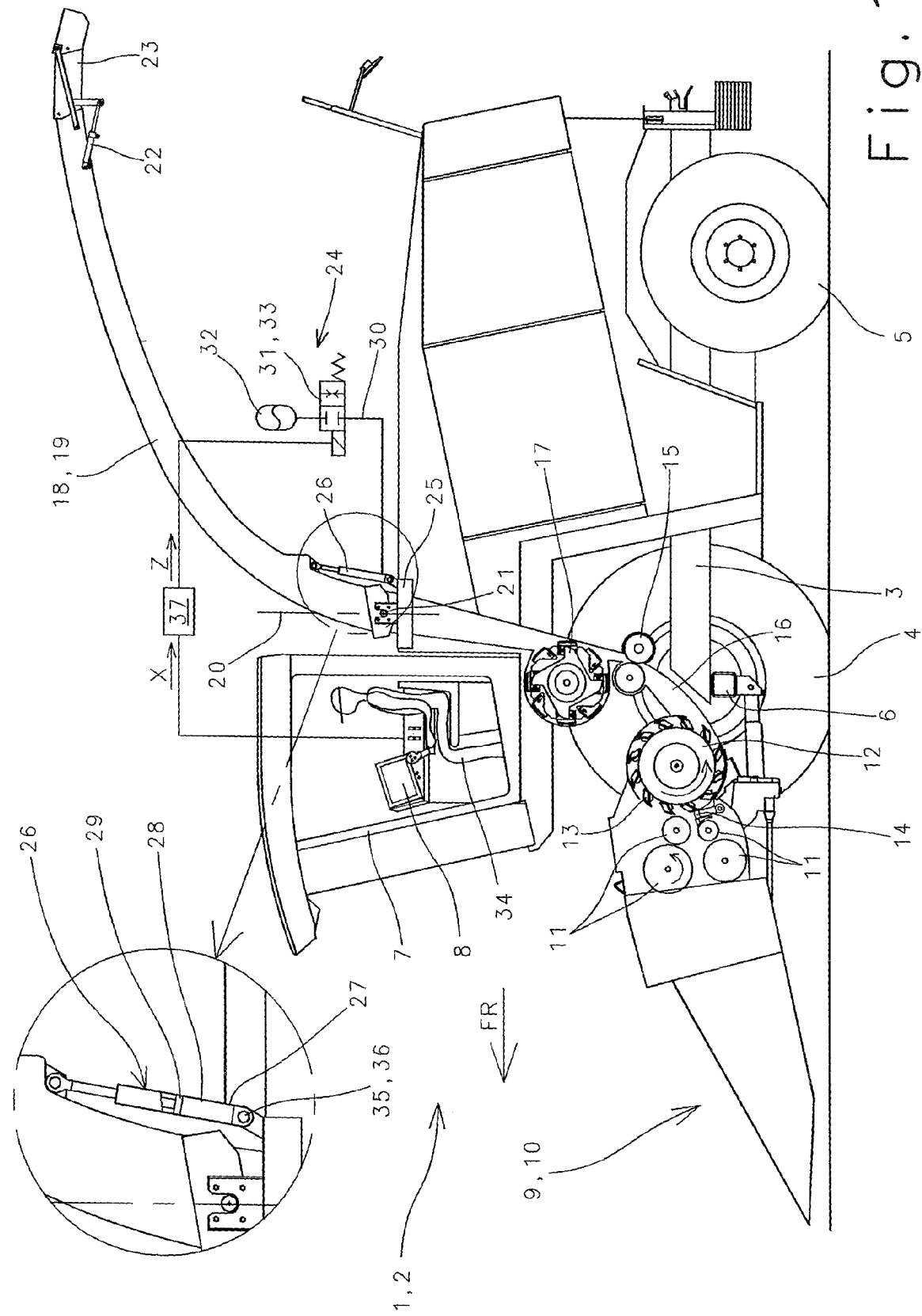
FIG. 1: Shows a schematic side view of a forage harvester with a transfer device that has been swiveled into the rearward position

FIG. 1 shows a sectional side view of an agricultural harvesting machine 2 designed as a self-propelled forage harvester 1. Harvesting machine 2 is built on a frame 3 that is carried by driven front wheels 4 and steerable rear Wheels 5. Agricultural harvesting machine 2 is operated from driver's cab 7, which is located above front axle 6. Driver's cab 7 includes a display unit 8 for visualizing operating and machine-related information. A crop material pick-up device 9 is assigned to the front—as viewed in the direction of travel FR—of forage harvester 1. In this exemplary embodiment, crop material pick-up device 9 is designed as a corn header 10; it picks up the not-shown crop material during the working operation, fragmentizes it if necessary, and guides it to downstream intake and compression rollers 11. Intake and compression rollers 11 guide the crop material to downstream, rotating chopper drum 12, the rotating cutter blades 13 of which fragmentize the crop material at a shear bar 14.

The fragmentized crop material is subsequently transferred to a post-fragmentation device 15, which pounds the crop grains, e.g., corn, and transfers them via a conveyer chute 16 to a post-accelerator 17. Post-accelerator 17 accelerates the fragmentized crop material and conveys it—via a transfer device, which is referred to here as an upper discharge chute 18—to a not-shown hauling vehicle. The cross section of upper discharge chute 18 is shaped as an upside-down "U" that is open largely downward. This design is necessary due to the centrifugal force that acts on the crop material and conveys the crop material along the top surface of upper discharge chute 18.

The side walls guide the crop material laterally. Upper discharge chute 18 is located on a mounting pedestal 25—which is typically located directly behind driver's cab 7 of forage harvester 1—such that it is swivelable around a vertical axis 20 and, to adjust the height, around a horizontal axis 21. A discharge flap 23, which is adjustable using a hydraulic cylinder 22, is located on the discharge-end of upper discharge chute 18. Via the position of discharge flap 23, it is possible to control the range, i.e., the distance between the input-side end of upper discharge chute 18 located on forage harvester 1 and the impact point of the crop material flow on the hauling vehicle. When discharge flap 23 is swiveled downward, the range is less than when discharge flap 23 is swiveled upward, while the height of upper discharge chute 18 remains the same.

Until now, it was known to support transfer devices 19 of this type in a rigid manner. Given the trend toward longer transfer devices 19, it is particularly disadvantageous when strong forces act on the fastening elements of transfer device 19 and on transfer device 19 itself. As an alternative known from the related art, it is therefore known to continually dampen and/or cushion transfer device 19 using a dampening device 24, to protect transfer device 19 itself or its fastening elements from strong loads. A disadvantage of this design is that permanent dampening of transfer device 19—with its increasing length—greatly impairs the control of the process of transferring the crop material to the hauling vehicle during the harvesting operation, in particular when driving over uneven terrain. It is highly desirable to load the loading chamber of the hauling vehicle with great precision, to prevent a considerable loss of crop material.

According to the present invention, dampening device 24 located between transfer device 19 and mounting pedestal 25 is adjustable as a function of specified operating criteria of harvesting machine 2, so that dampening may be carried out when high loads are placed on the transfer device itself or on not-shown fastening elements, thereby preventing damage to the material. When crop material is transferred to a hauling vehicle, it is also possible to block dampening device 24 to attain a high level of controllability of the crop material stream. Dampening device 24 is designed as a simple-acting hydraulic cylinder 26, which is hingedly mounted via one end on transfer device 19 and via the other end on mounting pedestal 25 of transfer device 19. In another embodiment, it could be designed to be double-acting.

Hydraulic cylinder 26 includes a pressure chamber 28 located in cylinder housing 27, in which a piston 29 is displaceable longitudinally. Pressure chamber 28 is connected to a pressure reservoir 32 via a pressure line 20 with a valve device 31. The dampening action is attained via pressure reservoir 32. Pressure reservoir 32 is a nitrogen gas pressure reservoir having a known design and which accommodates a partial volume of pressure reservoir 28 when hydraulic cylinder 26 moves. Pressure reservoir 32 has a pressure pre-load. In the exemplary embodiment, valve device 31—which is designed as a proportional valve 33—is controllable via an electrical or electronic evaluation and control device 37.

Using sensors that are known per se and are not shown here, the control and evaluation device receives signals X regarding the ground speed, the height of the front attachment, the crop material throughput quantity, the position of transfer device 19, and the operating state of chopper drum 12 of agricultural harvesting machine 2. Signals X that are detected are supplied to evaluation and control device 37 for evaluation. Using signals X in particular, differentiated information about the forces and loads acting on transfer device 19 may be derived. When crop material is harvested and conveyed, and this is sensed by the sensors, related signals X are transmitted to evaluation and control device 37.

Control and evaluation device 37 evaluates signals X and generates a signal Z. In accordance with signal Z, proportional valve 33 is used to block the pressure line between hydraulic cylinder 22 and pressure reservoir 32, to prevent dampening and/or cushioning of transfer device 19, thereby ensuring a controllable process of transferring the crop material to the hauling vehicle. If no crop material is conveyed, proportional valve 33 opens pressure line 30, so that transfer device 19 is dampened. The dampening rate is ascertained based on the evaluation of signals X detected by the sensors described above.

Dampening device 24 is adjusted by proportional valve 33 throttling the oil exchange between hydraulic cylinder 22 and pressure reservoir 32. It is also feasible for the switching on and off of dampening device 24 and/or the adjustment of the dampening rate to be performed manually by operator 34 of agricultural harvesting machine 2, or for this work to be performed automatically by an electrical or electronic evaluation and control unit 37. In a further embodiment, the process of activating dampening device 24 is integrated in a not-shown electronic headland management system, which activates and adjusts dampening device 24.

As an alternative or in addition thereto, the load on transfer device 19 may be sensed via a load sensor 36 designed as a force-measuring bolt 35. Dampening device 24 is activated and/or adjusted based on the load that is sensed. Display unit 8 installed in driver's cab 7 visualizes for the operator the particular status of dampening device 19, i.e., active or inactive, and the particular dampening rate, so that operator 34 of agricultural harvesting machine 2 is continually informed about the dampening status.

Even though the present invention was described with reference to only one exemplary embodiment, one skilled in the technical art will deduce—in light of the above description—many diverse alternatives, modifications, and variants that fall within the scope of the present invention. In addition, the present invention is not designed exclusively for use with self-propelled forage harvester 1. Other types of agricultural harvesting machines 2, such as combine harvesters with unloading auger tube, or a potato harvester or sugar-beet lifter with a delivery belt, may also be equipped with a dampening device 24, which is adjustable as a function of operating criteria.

It will be understood that each of the elements described above, or two or more together, may also find a useful application in other types of constructions differing from the type described above.

While the invention has been illustrated and described as embodied in an agricultural harvesting machine with transfer device, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An agricultural harvesting machine, comprising a vehicle body; feeder and chopping devices; a transfer device located downstream from said feeder and chopping devices and swivelable around a horizontal and vertical axis, for transferring a crop material; at least one dampening device located between said vehicle body and said transfer device for dampening vibrations of said transfer device, said dampening device being adjustable as a function of specified operating criteria of the agricultural harvesting machine in order to dampen the vibrations of said transfer device, wherein said at least one dampening device is configured as a hydro-pneumatic dampening device with at least one hydraulic cylinder connected to a pressure reservoir with a chamber in which a pressure is blockable using a valve device by closing a connection between said hydraulic cylinder and said pressure reservoir.

2. An agricultural harvesting machine as defined in claim 1, wherein said valve device is located between said pressure chamber of said at least one hydraulic cylinder and said pressure reservoir and configured as a proportional valve.

3. An agricultural harvesting machine as defined in claim 1, wherein said dampening device is adjustable as a function of the specified operating criteria including criteria selected from the group consisting of a ground speed, a crop material throughput quantity, a height of an associated front attachment, a position of said transfer device, and an operating state of a chopper drum.

4. An agricultural harvesting machine as defined in claim 1, wherein said dampening device is configured so that it is preferably inactive when said transfer device conveys crop material and preferably initiates dampening of said transfer device when said transfer device does not convey crop material.

5. An agricultural harvesting machine as defined in claim 1; and further comprising an evaluation and control unit provided for controlling said dampening device, said evaluation and control unit being configured so that it controls a parameter selected from the group consisting of a switching on and off of said dampening device, an adjusting of a dampening rate of said dampening device, and both as a function of specified operating criteria.

6. An agricultural harvesting machine as defined in claim 5, wherein said dampening device is configured so that the switching on and off of said dampening device, the adjustment of the dampening rate, and both is performed manually by an operator of the agricultural harvesting machine or automatically by said evaluation and control unit.

7. An agricultural harvesting machine as defined in claim 1; and further comprising means for ascertaining the operating criteria and configured as sensors that provide signals X, as a function of which said dampening device is controllable.

8. An agricultural harvesting machine as defined in claim 1, wherein said dampening device is configured so that a process for activating and controlling said dampening device is integrated in an electronic headland management system which activates and adjusts said dampening device.

9. An agricultural harvesting machine as defined in claim 1; and further comprising a load sensor assigned to said transfer device for sensing a load.

10. An agricultural harvesting machine as defined in claim 9, wherein said load sensor is configured as a force-measuring bolt.

11. An agricultural harvesting machine as defined in claim 1; and further comprising a driver's cab with a display device which is configured for visualization of a particular status of said dampening device selected from the group consisting of active and inactive, and a particular dampening rate.

12. An agricultural harvesting machine as defined in claim 1, wherein the agricultural harvesting machine is configured as a machine selected from the group consisting of a combine harvester, a potato harvester, and a sugar-beet lifter, while said transfer device is configured as a device selected from the group consisting of an unloading auger tube and a delivery belt.

13. An agricultural harvesting machine as defined in claim 1, wherein the agricultural harvesting machine is configured as a self-propelled forage harvester.

* * * * *